L. W. ROSENTHAL & M. C. HOPKINS.
CALCULATING MACHINE.
APPLICATION FILED JULY 18, 1912.
1,237,703.
Patented Aug. 21, 1917.
6 SHEETS—SHEET 1.
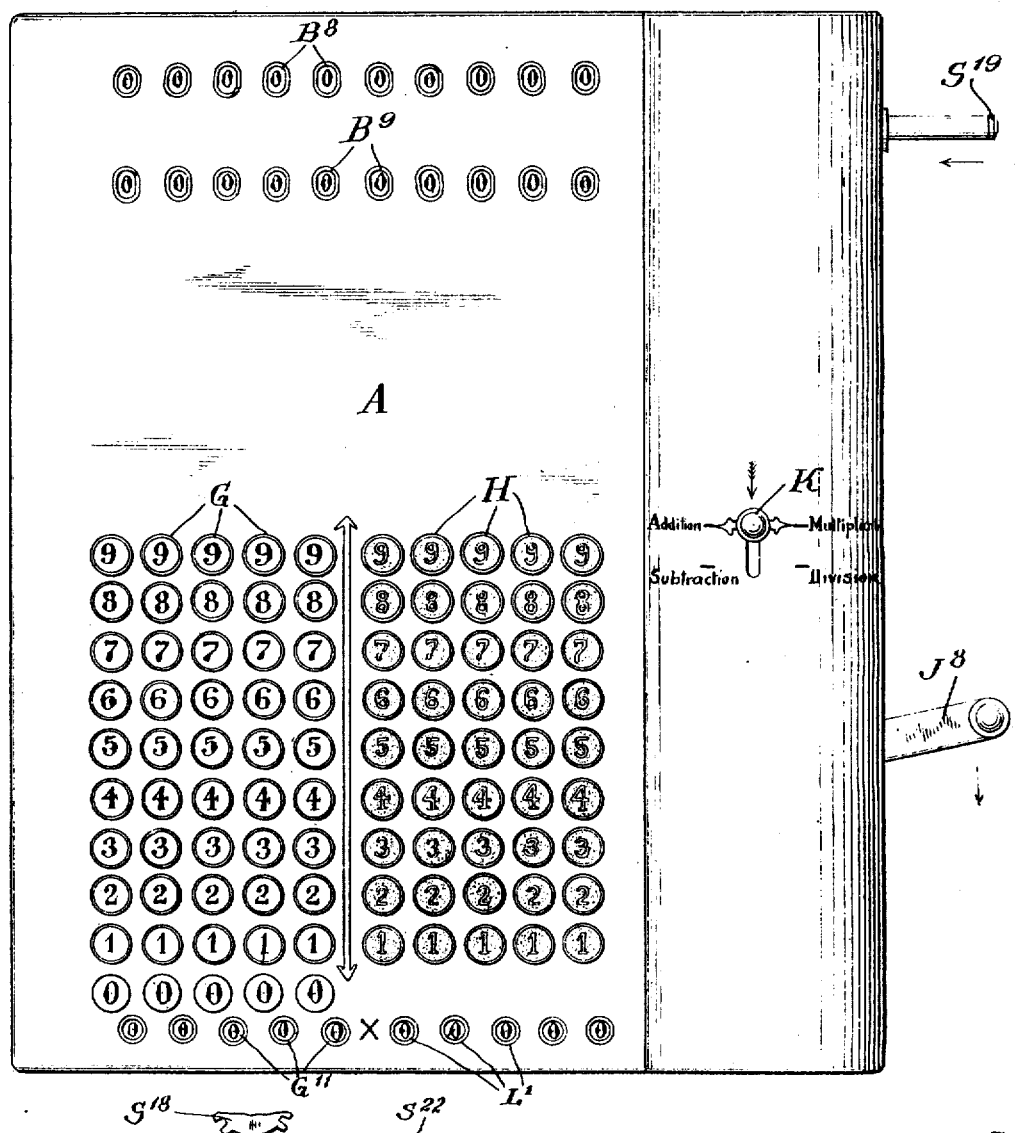

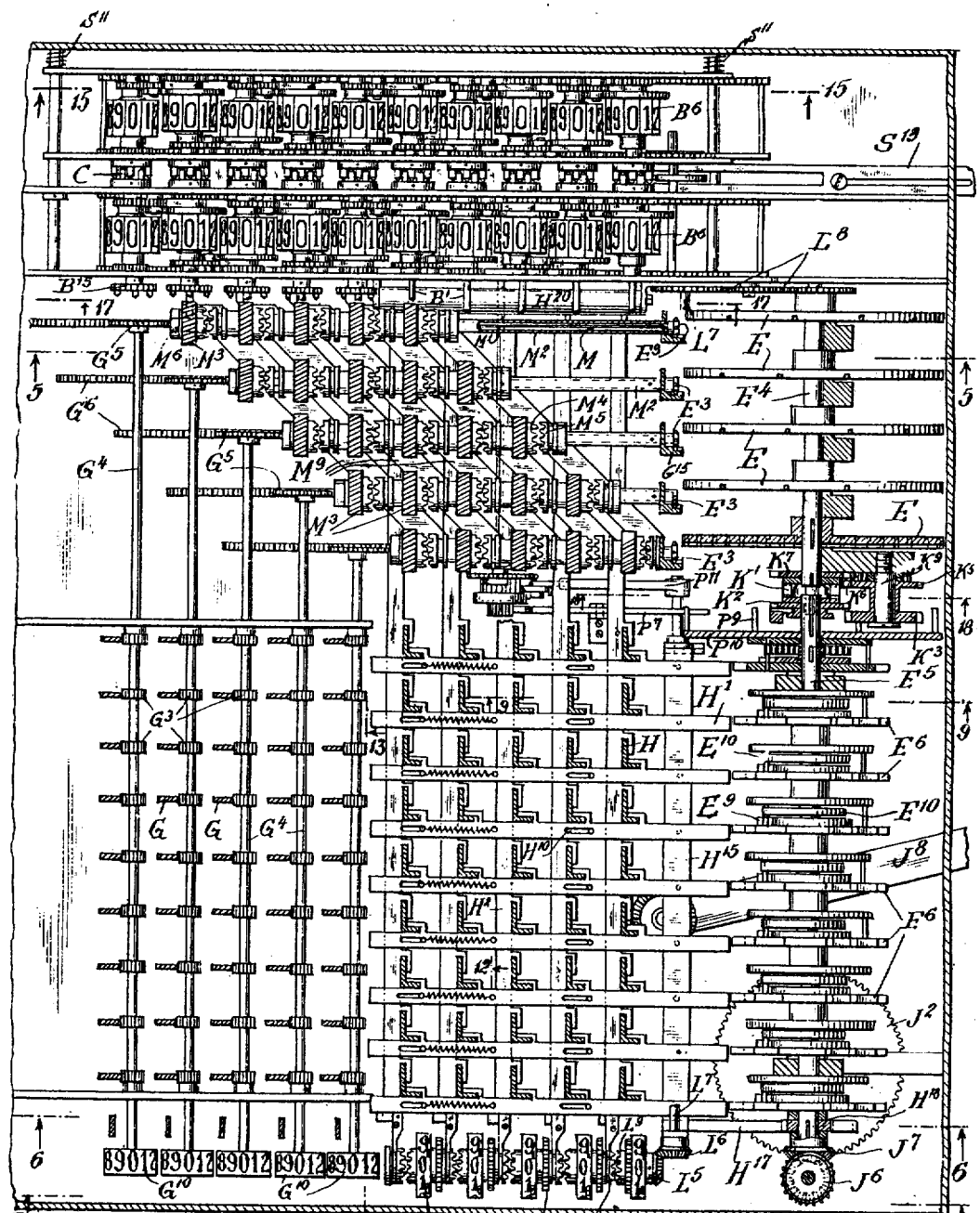

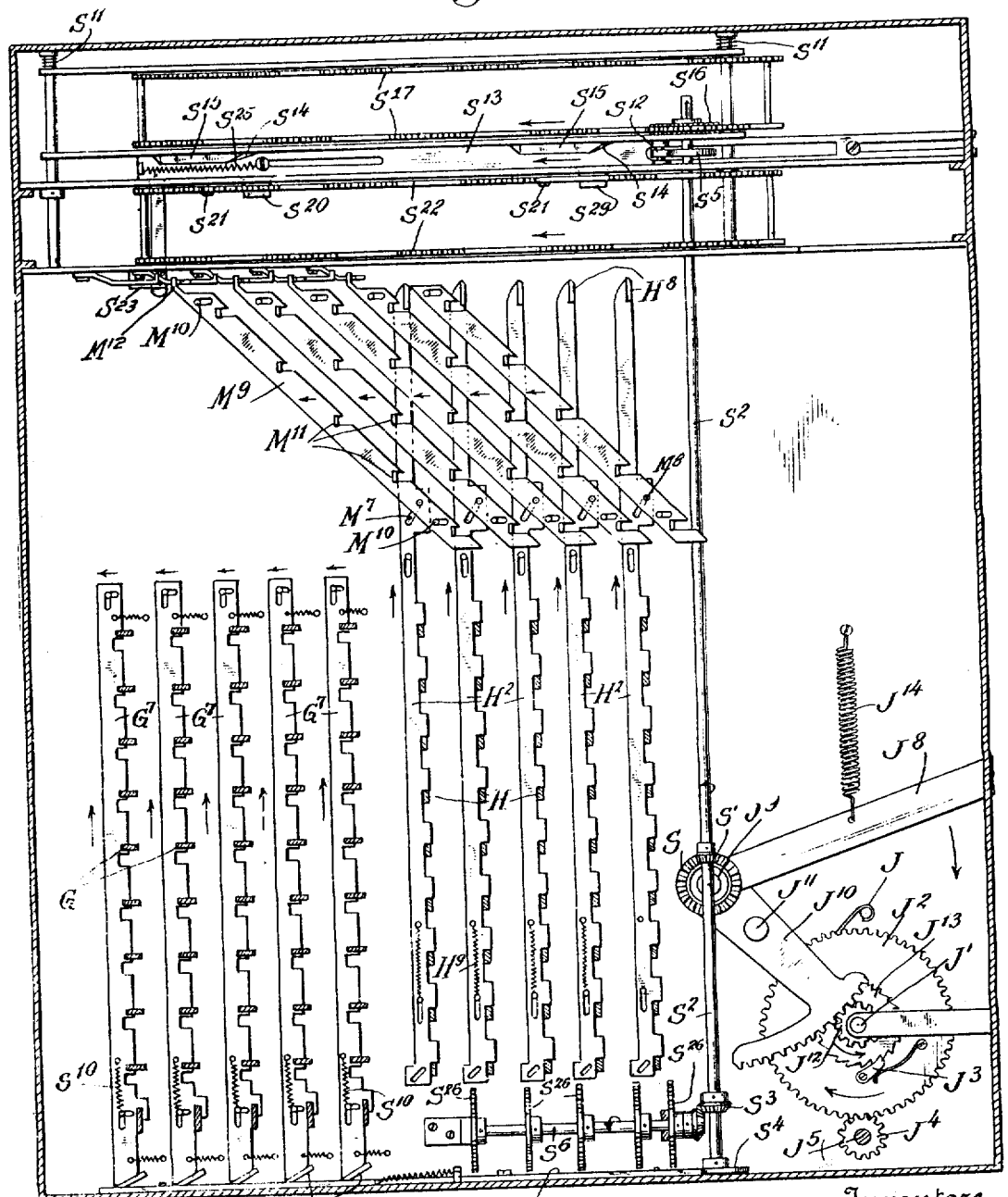

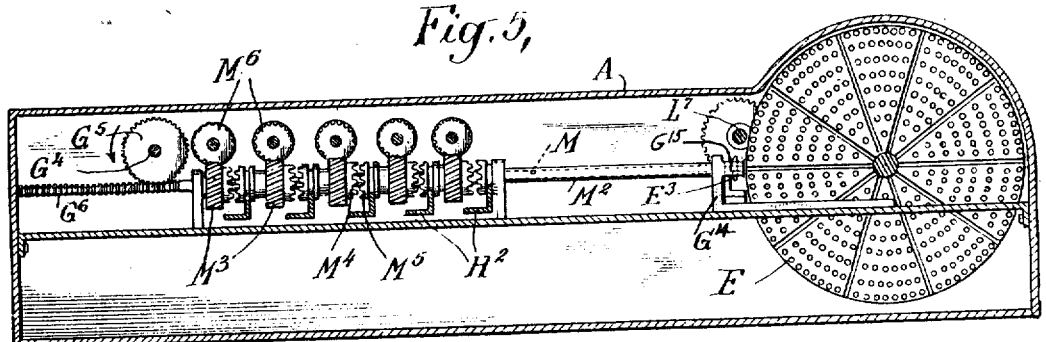
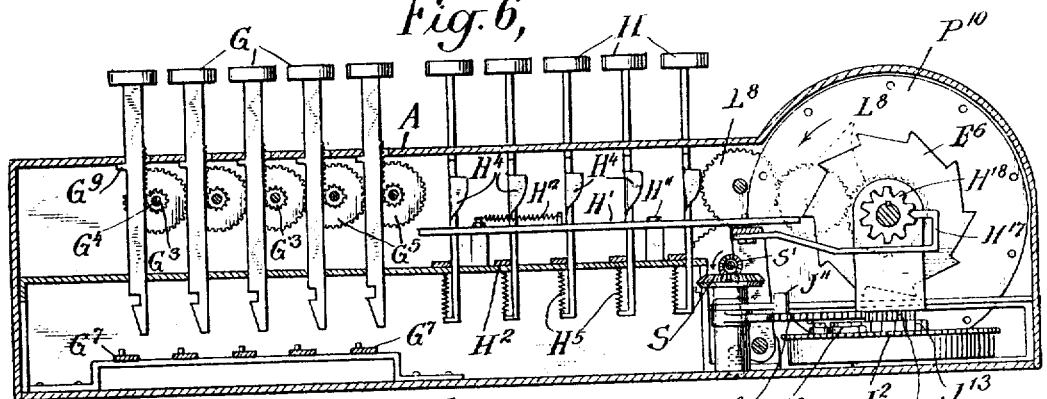
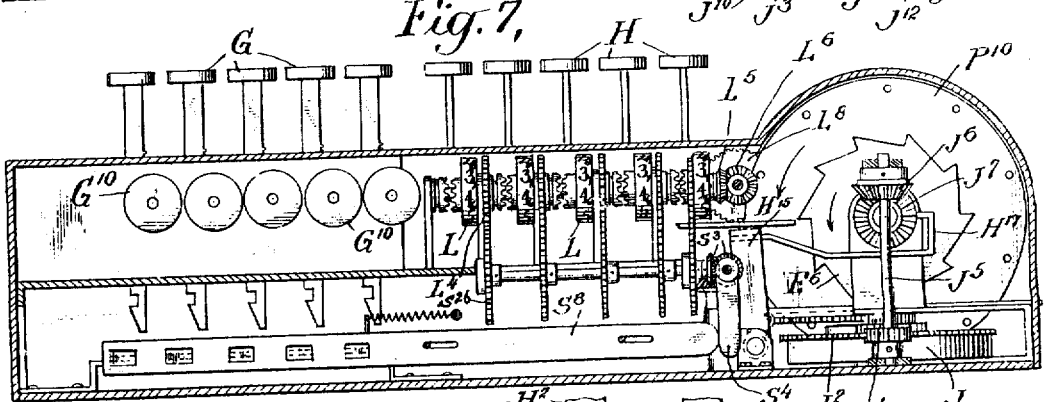
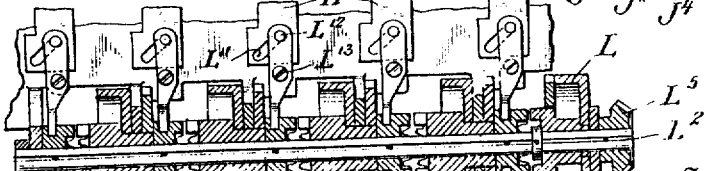

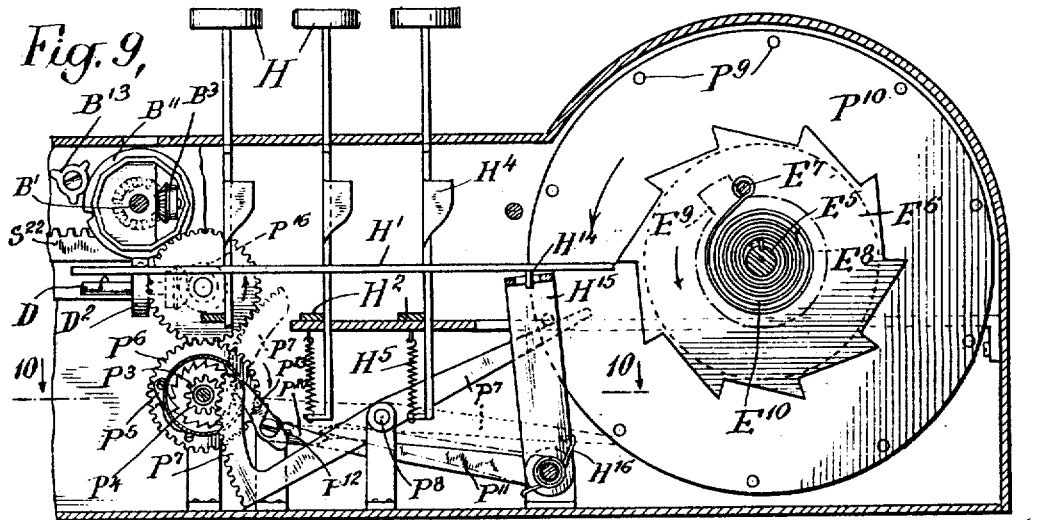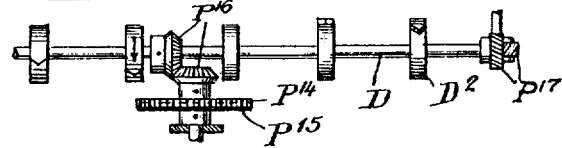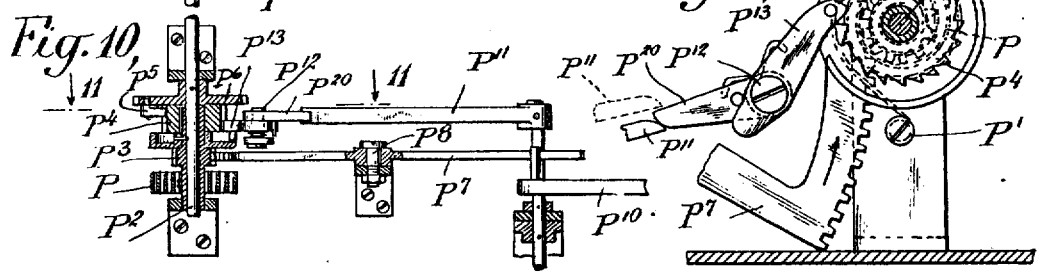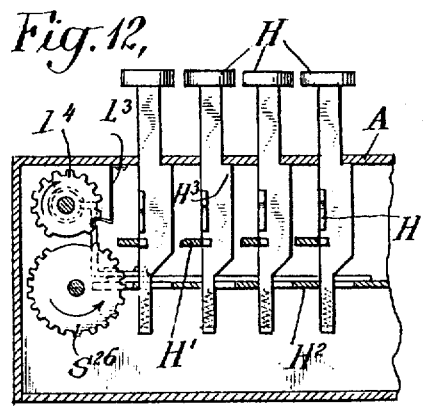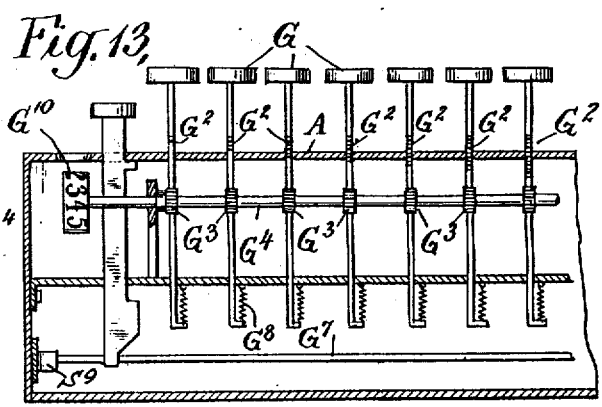

L. W. ROSENTHAL & M. C. HOPKINS.
CALCULATING MACHINE.
APPLICATION FILED JULY 18, 1912.
1,237,703.
Patented Aug. 21, 1917.
6 SHEETS—SHEET 6.
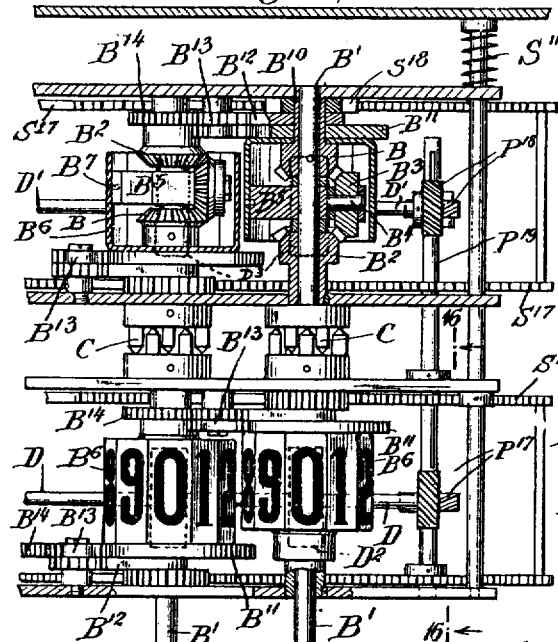
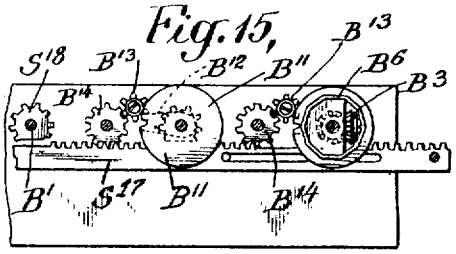
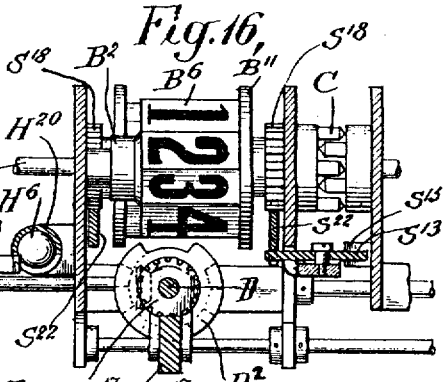
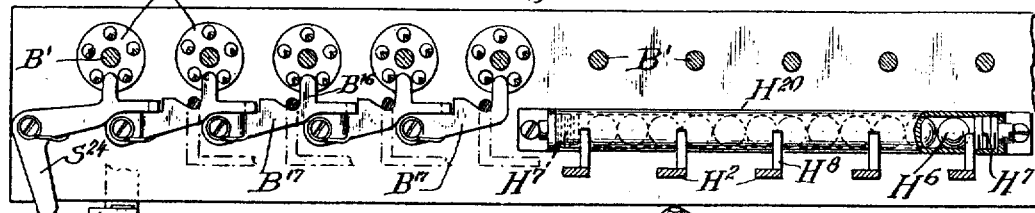
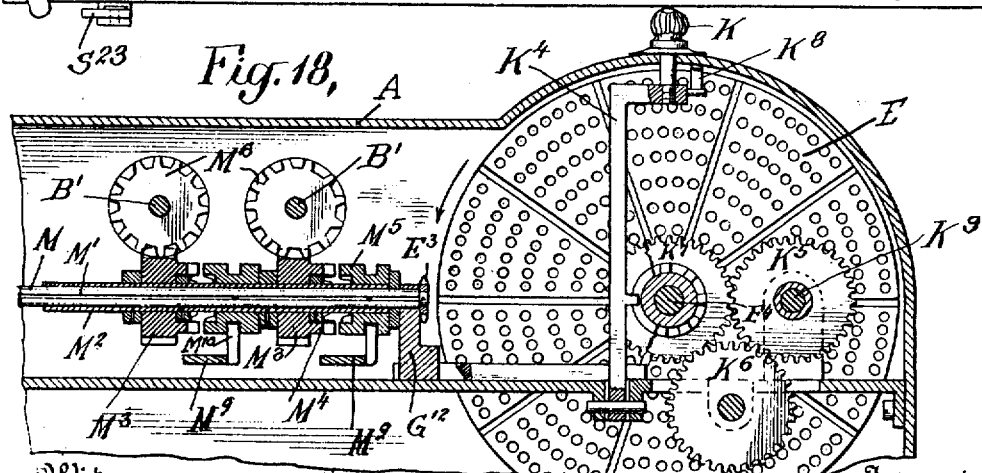

UNITED STATES PATENT OFFICE.

LEON W. ROSENTHAL, OF NEW YORK, N. Y., AND MARCUS C. HOPKINS, OF JERSEY CITY, NEW JERSEY; SAID HOPKINS ASSIGNOR TO SAID ROSENTHAL.

CALCULATING-MACHINE.

1,237,703.   Specification of Letters Patent.   Patented Aug. 21, 1917.

Application filed July 18, 1912. Serial No. 710,273.

*To all whom it may concern:*

Be it known that we, LEON W. ROSENTHAL and MARCUS C. HOPKINS, citizens of the United States, and residing, respectively, at No. 240 West 137th street, in the city, county, and State of New York, and No. 101 Sip avenue, Jersey City, Hudson county, State of New Jersey, have invented certain new and useful Improvements in Calculating-Machines; and we do hereby declare the following to be a full, clear, and exact description of the invention, such as will enable others skilled in the art to which it appertains to make and use the same.

Calculating machines for performing the ordinary arithmetical computations may be grouped into those primarily adapted to perform addition and subtraction, herein termed "adding machines", and those primarily adapted to perform multiplication and division, herein termed "multiplying machines". The essential differences in construction of machines of these two groups results from the operations involved in addition as distinguished from the operations involved in multiplication. Addition may be considered as the operation of finding the sum of the products of each number to be added and the digit 1 of the units denomination, whereas multiplication consists in finding the product of the multiplicand factor and the multiplier factor wherein the multiplier digits have different denominations and any value from 0 to 9. Hence in addition the separate products to be added are not indented in denomination relatively to each other since the multiplier digit is always of units denomination, and furthermore the separate digits of the numbers to be added are registered on the adding mechanism without modification since the multiplier digit always has a value of 1. However, in multiplication the partial results obtained by multiplying the multiplicand factor by each multiplier digit must be registered on different series of the indicators of the adding mechanisms in accordance with the different denominations of the multiplier, and furthermore each multiplicand digit must be multiplied by digits of values ranging from 0 to 9.

So far as we are aware, all multiplying machines disclosed heretofore effect denominational indentation by shifting the adding mechanism after each partial result is registered on the product indicators. In the co-pending application of Leon W. Rosenthal, Serial No. 608622, filed February 14, 1911, denominational indentation is effected by shifting the multiplying mechanism step-by-step, while in the co-pending applications of the same applicant Serial No. 621874 filed April 18, 1911, and Serial No. 630162, filed May 29, 1911, the driving mechanisms for registering the partial results are arranged in indented relation, and like the product indicators, are non-shiftable in denomination so that intermittent disengagement and reëngagement of the parts is eliminated. In multiplying machines the multiplying mechanism may comprise driving mechanisms including variable-ratio gearings which are set in accordance with the individual digits of one factor and which are actuated in accordance with the digits of the other factor to register the partial results on the product indicators; or they may comprise driving mechanisms having members on which are represented the separate digits of partial products and which are positioned in accordance with the digits to be multiplied together to register the partial products on the adding mechanism. In all cases the partial results are registered in proper denominational relation on the adding mechanism to indicate thereon the product of the multiplicand and multiplier.

The present invention relates to calculating machines of the kind herein termed "multiplying machines", and more specifically to one primarily adapted to mechanically attain an indication of the product of factors having any number of digits up to the number provided for, wherein the factors may have digits of any value and in any sequence. The machine also readily performs division, addition and subtraction, and may easily be provided with printing mechanism and other devices suitable for auditing and analogous work. An object of the invention is to provide a non-indenting adding mechanism on which the partial results are added or subtracted without shifting the indicators in denomination, together with a multiplying mechanism which is likewise non-shiftable in denomination, in combination with suitable devices for connecting the multiplying mechanism with different series of the indicators of the adding mechanism in accordance with the different denominations of the multiplier. By this arrangement the denominational shifting of the adding mechanism and of the multiplying mechanism is avoided, while the number of driving mechanisms is equal to the number of multiplicand digits provided for.

Any suitable form of adding mechanism may be used, and the transfer of the units to higher denominations may be delayed or may be made simultaneously with the adding movements. Likewise, any suitable form of multiplying mechanism may be used, and the driving mechanisms thereof may comprise variable-ratio gearings, members on which partial products are represented, or otherwise, and they may be operated by hand or by any suitable form of motor. Furthermore, the connections between the multiplying and adding mechanisms may be constructed in many ways, the essential condition being that means be provided for connecting the two mechanisms in various denominational relations without shifting either one relatively to the other. However, novel forms of construction are disclosed herein for each of these three elements and each element specifically disclosed has advantageous characteristics in combination with various forms of other elements in application to adding and other calculating machines as well as to multiplying machines. Therefore, it will be apparent that many forms of calculating machines may be constructed in accordance with one or more of the ideas embodied in this invention, and that the devices described for carrying out the different functions may be variously modified, so that in showing and describing the preferred form of machine, we do not in any way limit ourselves to these specific arrangements, details of construction, or modes of operation, but on the contrary, we propose to cover all structures within the broad interpretation of the appended claims.

In the preferred embodiment of our invention, we show two adding mechanisms connected together to indicate each product and the accumulated sum of a number of products wherein each mechanism comprises differential gearings arranged like those in our copending application Serial No. 680246, filed February 27, 1912, but provided with a rectifier of novel form and actuated in a novel way for completing the transfer of units between the indicators after each partial result is registered thereon. The multiplying mechanism comprises variable-ratio gearings of novel form and equal in number to the number of multiplicand digits provided for. Each variable-ratio gearing comprises a disk of novel form and a gear driven thereby in amounts determined by the position to which the gear is set relatively to the disk. and by the amount of rotation of disk.

The position of each gear is controlled by a bank of keys, 0 to 9, so that any multiplicand digit may be set up by each variable-ratio gearing, and any multiplicand factor within the capacity of the machine may be set up by the series of variable-ratio gearings. The disks are collectively turned by a spring motor, and the amount of movement is controlled by multiplier keys and associated stopping mechanism of novel construction. There is a bank of keys, 1 to 9, for each multiplier denomination, and the keys of the same value in the different banks permit the same amount of rotation of the disks, irrespective of their denomination. The arrangement of the transmitting connections embodies a novel idea in multiplying machines, and comprises a shaft extending from each indicator of the adding mechanism, except from the one of highest denomination, and an actuating shaft from each gear of the variable-ratio gearings. The shafts from the indicators and the shafts from the gears cross each other and are arranged in constant connective relation at certain points of crossing. The actuating shafts are operatively connected with a different series of indicator shafts for each denomination of the multiplier by depressing any key in the bank of that denomination. In this way, any multiplier key first operatively connects the series of actuating shafts with a series of indicator shafts in accordance with the denomination of the key and then the spring motor is released to actuate the disks in accordance with the value of the key, so that the products of the separate digits of the multiplicand and multiplier are registered in proper denominational relation on the adding mechanism to indicate thereon the product of the multiplicand and multiplier.

The preferred form of construction and mode of operation employed in performing multiplication and the other arithmetical operation for which the machine is adapted, and for indicating the results, will now be described in detail in connection with the accompanying drawings in which, Figure 1 represents a top plan of the machine;

Fig. 2 represents an elevation of a part of the clearing mechanism;

Fig. 3 represents a plan, partly in section, with the cover removed;

Fig. 4 represents a plan, partly in section, showing some of the operating parts;

Fig. 5 is an elevation on section line 5—5 of Fig. 3;

Fig. 6 is an elevation on section line 6—6 of Fig. 3;

Fig. 7 is an elevation on section line 7—7 of Fig. 3;

Fig. 8 represents an enlarged section of the clutches for the multiplier indicators;

Fig. 9 is an enlarged elevation on section line 9—9 of Fig. 3;

Fig. 10 is a plan on section line 10—10 of Fig. 9;

Fig. 11 is an enlarged elevation on section line 11—11 of Fig. 10;

Fig. 12 is an enlarged elevation on section line 12—12 of Fig. 3;

Fig. 13 is an enlarged elevation on section line 13—13 of Fig. 3;

Fig. 14 represents an enlarged plan, partly in section, of a part of the adding and accumulating mechanisms;

Fig. 15 is an elevation on section line 15—15 of Fig. 3;

Fig. 16 is an elevation on section line 16—16 of Fig. 14;

Fig. 17 is an enlarged front elevation on section line 17—17 of Fig. 3; and

Fig. 18 is an enlarged elevation on section line 18—18 of Fig. 3.

A machine may be constructed in accordance with the invention for any number of digits in any of the numbers, and any machine so constructed is also capable of performing all the mathematical operations on numbers having any lesser number of digits. The machine herein shown has a capacity in multiplication of five digits in each of the factors. The machine is provided with a casing A having suitable openings for the exteriorly extending parts, and suitable windows for the indicators.

The adding mechanism comprises the result indicators and the transfer mechanism for carrying units to next higher denominations, while the accumulating mechanism is similar to the adding mechanism and accumulates or totalizes the separate results. The construction is similar in many respects to one of the forms described in our co-pending application Serial No. 680246 referred to above, and therefore, it will suffice to briefly describe the construction in this application.

The adding mechanism is shown at the extreme top of Fig. 3 and the accumulating mechanism is shown directly below it, the two mechanisms being disengageably connected by the five point clutch-members C. Each differential gearing comprises a driving component, the bevel gear B, fastened on the indicator shaft $B^1$; a transfer receiving component, the bevel gear $B^2$, loosely mounted on shaft $B^1$; and a transfer actuating component, the bevel gear $B^3$, in mesh with gears B and $B^2$ and loosely mounted on a stud $B^4$ of a carrier $B^5$, which is loosely mounted for rotation on the shaft $B^1$ and fastened to the dial $B^6$ by a pin $B^7$. (See Figs. 3, 9, 14, 15 and 16). The digits 0 to 9 are arranged consecutively in the same direction around each of the dials and the windows $B^8$ and $B^9$ are provided in the top of the casing A (Fig. 1). On the sleeve $B^{10}$ carrying the dial $B^6$ is also fastened a cut-out disk $B^{11}$ secured to a two-tooth segment $B^{12}$. The periphery of the cut-out disk runs in the cut-out part of a six-tooth intermediate transfer gear $B^{13}$, while the segment $B^{12}$ engages with the six teeth thereof to turn the gear two teeth or one-third of a rotation when the corresponding dial is passing from 9 to 0 in addition, or from 0 to 9 in subtraction. The six-tooth part of this cut-out gear $B^{13}$ engages with the ten-tooth transfer gear $B^{14}$, which is fastened to the transfer receiving component $B^2$ of the differential gearing. The cut-out disk $B^{11}$ and the segment $B^{12}$ are omitted from the highest denomination, while the ten-tooth transfer gear $B^{14}$ is omitted from the lowest denomination of both the adding and the accumulating mechanisms. The adjacent differential gearings are reversely arranged so as to bring the ten-tooth transfer gear $B^{14}$ of one denomination in line with the toothed segment $B^{12}$ of next lower denomination.

The arrangement of the adding and accumulating mechanism is such that upon turning any indicator shaft $B^1$, the corresponding driving components B of the adding and accumulating mechanisms are turned through the same amount. The transfer receiving components $B^2$ of those differential gearings are locked in position as a result of the engagement of the intermediate transfer gears $B^{13}$ with the respective transfer gears $B^{14}$ and with the cut-out disks $B^{11}$, while the transfer receiving components $B^2$ of lowest denomination are fastened to a fixed part of the machine as shown at the right of Fig. 14. Hence, the bevel gears $B^3$ of the differential gearings are rolled on their respective transfer receiving components $B^2$ and turn the dials $B^6$ through one-half of the amount of rotation of the indicator shaft. Thus by turning a shaft $B^1$ through two rotations, the corresponding dials of the adding and accumulating mechanisms are each turned through one rotation, or 10 digits. When any dial is passing from 9 to 0 in one direction or from 0 to 9 in the other direction, as the case may be, the toothed-segment $B^{12}$ advances the ten-tooth transfer gear $B^{14}$ of the next higher denomination two teeth in the same direction as the dial, through the intermediate transfer gear $B^{13}$, the transfer receiving component $B^2$ of that next higher denomination being turned through one-fifth of a rotation. The component $B^3$ is turned thereby through one-tenth of a rotation in the same direction as by its driving component B, and through the amount produced by one-fifth of a rotation of the shaft $B^1$, or one digit. Units are transferred in this way to a higher denomination when the shaft $B^1$ of that denomination is not being actuated. However, when the shaft $B^1$ of a denomination is being rotated one-fifth of a rotation at the same time that a transfer movement is being imposed upon that denomination, the bevel gears B and B² move in the same direction and carry the component B³ one-fifth of a rotation or two digits on the indicator, thereby indicating the sum of the adding and transfer movements. During this operation the gear B³ is not rotated upon its stud B⁴.

In transferring units, it is necessary to lock against rotation those indicator shafts to which the units are to be carried. Since units can never be transferred to the indicators of the five lowest denominations at any time other than when they are connected to the multiplying mechanism, only the indicator shafts of the five highest denominations in the machine herein shown are provided with special locking devices.

For this purpose the five shafts B¹ of highest denomination, shown at the left in Fig. 17, are provided with disks B¹⁵ having five pins, between which the toes B¹⁶ of the spring pressed locks B¹⁷ are adapted to fit so as to normally prevent the respective shafts from turning. The locks are so shaped that when any one is pressed from between the pins it also carries all others of lower denomination out of engagement. In this way, all shafts up to and including the one of highest denomination engaged by the multiplying mechanism at any time become unlocked, while those of still higher denominations remain locked. The means for depressing the toes B¹⁶ out of locking engagement with the disks B¹⁵ during the operation of the machine and when clearing indicators will be described hereinafter.

We have found in constructing adding mechanisms of this kind comprising a plurality of denominations, that the transfer movements may be gradually lost in a long succession of carrying operations as a result of the back lash and lost motion in the positively engaged elements. To overcome this difficulty we have provided rectifiers of novel form for the adding and accumulating mechanisms. Each rectifier completely positions the dials progressively from the lowest to the highest denominations and holds each one locked until the operation is entirely completed, after each partial result is registered thereon, thereby completing all partial transfers which may have occurred in the mechanism. (Figs. 3, 9, 10, 11, 14 and 16.) For this purpose, there is provided a rectifier shaft D with the cams D² for the adding mechanism, and a rectifier shaft D¹ with the cams D³ for the accumulating mechanism, there being one cam directly below each of the dials B⁶ and B⁷. Each of the dials is polygonal shaped in outline and each of the cam surfaces is round and adapted to engage with the bottom face of its dial to turn the dial in one direction or the other from a slightly offset position which it may have after the operation of the machine in either direction to a position in which the top and bottom faces are horizontal. Each cam D² or D³ comprises a segment of a disk fastened on its shaft D or D¹, respectively. The cam D² operating on the adding mechanism dial B⁶ of lowest denomination (i. e. at the extreme right in Fig. 3) is shown in full lines in Fig. 16, and the cam D³ for the corresponding dial B⁷ of the accumulating mechanism is similar thereto. The cam D² for the dial of next higher denomination has a somewhat greater cutaway portion, the cam surface starting a little farther back and ending in the same line, so that upon rotation in the direction indicated by the arrow in Fig. 10, it engages its dial a little later than the cam for the dial of the lowest denomination, but both disengage their respective dials at the same time. Similarly the cams D² and D³ engage the dials B⁶ and B⁷ of successively higher denominations at progressively later periods of the turning operation of the shafts D and D¹, but as before they disengage therefrom at the same period. In this way, the dials of each mechanism are rectified from the lowest to the highest denomination in turn, so that the lost motion and back lash between adjacent dials is successively taken up, and all carry movements of the transfer devices, which may have not been finished, are then completed throughout the entire adding mechanism, and all the dials brought to an accurate reading position after the rectifier has done its work. Furthermore, each dial is held in position against movement by the remaining portion of the cam surface just after the dial is rectified, and finally all the dials are simultaneously released by the cams, when the shafts D and D¹ complete their rotation and come to the position shown in Fig. 16, whereby the dials B⁶ and B⁷ may again be actuated by the driving mechanism without interference from the rectifiers. The devices provide for rotating the shafts D and D¹ one rotation after each partial result has been registered on the adding and accumulating mechanisms will be described hereinafter.

The multiplying mechanism comprises the driving mechanism for registering the partial results on the indicators of the adding and accumulating mechanisms. Five driving mechanisms are shown, each comprising a variable-ratio gearing consisting of a disk having actuating means in the form of holes E¹ arranged in circles on the face of the disk and ten radially disposed slots E², together with a five-tooth gear E³ adapted to be moved radially of the disk along any one of the slots so as to be positioned in alinement with any selected circle of holes in accordance with a multiplicand digit. The innermost circle comprises ten slots so that when the gear $E^3$ is set to this position corresponding to the digit 1, it is turned through one tooth when the disk E is turned through one sector or one-tenth of a rotation. When the gear is set to the second circle corresponding to the digit 2, which contains ten holes and ten slots, it is turned through two teeth when the disk is turned through each sector. And similarly for the 3rd, 4th, 5th, 6th, 7th, 8th and 9th circles, whereupon the gear is turned through the corresponding number of teeth during the passage of each sector of the disk. And finally when the gear is positioned beyond the outer periphery of the disk, as shown in Figs. 3, 5 and 18, it is not actuated at all upon rotation of the disks, thus corresponding to the multiplicand digit 0. Now by turning the disk through one sector, the gear will be turned through a number of teeth equal to the multiplicand digit set up thereby, and by turning the disk through any number of sectors from 0 to 9 in accordance with the multiplier digit, the gear will be turned through a number of teeth equal to the product of the multiplicand and multiplier digits set up. Hence, by setting up a multiplicand factor having five or less digits, the products of the separate multiplicand digits and the multiplier digit corresponding to the number of sectors through which the disks are turned, may be registered on the adding and accumulating mechanisms by connecting the gears $E^3$ with the indicator shafts $B^1$ without any speed change between them, since each one-fifth rotation of an indicator shaft $B^1$ advances the respective indicator $B^6$ one digit, as noted above. The gears $E^3$ engage the locks $G^{15}$ as they are being disengaged from the disks E, and vice versa.

It will be apparent that a variable-ratio gearing of this kind, that is one in which the ratio of the driving to the driven speed may be varied in the ratio of the elementary digits 0 to 9, possesses characteristic advantages in application to calculating machines. The disks E may be machined, cast, stamped, or built up in any suitable way with any desired number of sectors having holes, depressions, teeth or other forms of actuating means, and the gear may be constructed in a variety of suitable ways and may have other number of teeth or engaging means if desired, the essential condition being that the proper relation be provided between the movement of the variable-ratio gearing and the resulting actuation of the indicators. The circumferential length of the circles of holes increases in a direct proportion to the digits 1 to 9, so that adjacent circles are separated by equal radial distances, while the gears $E^3$ are positively locked, or in other words, meshed in positive engagement at all times, either with the disk E or with the locks $G^{15}$, and can only be moved in radial position from one multiplicand setting to another when in engagement with a slot $E^2$. So far as we are aware the idea embodied in this form of variable-ratio gearing is broadly new, and therefore our claims in this connection should be broadly interpreted.

A keyboard comprising five columns or banks G of multiplicand keys 0 to 9 are provided for positioning the five gears $E^3$ relatively to the disks E to set up any multiplicand digits at will. The bank of keys G at the extreme left in Fig. 1 is of the highest denomination and positions the uppermost gear $E^3$ in Fig. 3, while the banks toward the right are of successively lower denominations and position the gears $E^3$ toward the bottom respectively. When none of the multiplicand keys of a bank is depressed, the corresponding gear $E^3$ is disengaged from its disk E. Each key shank, except those corresponding to 0 has teeth $G^2$ equal in number to ten minus the value of the digit which the particular key represents, and the gears $G^3$ fastened on the common shaft $G^4$ are adapted to engage the teeth of the individual keys to be turned thereby. (See Figs. 3, 6 and 13). A gear $G^5$ is also fastened on each shaft $G^4$ and engages the teeth around the corresponding shaft $G^6$ on the other end of which is fastened the gear $E^3$. When any key of a bank is depressed, the corresponding shaft $G^4$ is turned to move the gear $E^3$ of that denomination along the slot $E^2$ to a position in alinement with that circle of holes of the disk E corresponding to the number of digits represented by the key. The lower end of each key shank, except of the 0 key, has a cut-out portion and each one is tapered below the cut out portion, so that toward the end of the stroke the tapered part moves the locking plate $G^7$ sidewise against spring pressure and then becomes locked in depressed position. (See Fig. 4). In this way any key except the 0 key is held at a certain depressed position by the locking plate $G^7$ and the gear $E^3$ positioned thereby is held in proper alinement with its disk. The zero key of each multiplicand bank has a tapered end but no cut out portion and simply moves the locking plate of that bank forward to release any key, but without becoming locked itself, and is for the purpose of changing to 0 any multiplicand digit previously set up in its bank. Each spring $G^8$ has sufficient force to raise the respective key to the position determined by the stop $G^9$ and the top casing A when the key is released from engagement with the locking plate $G^7$, and at the same time to move the corresponding gear $E^3$ to its 0 position. The multiplicand indicators $G^{10}$ are fastened on the individual shafts $G^4$ and show the multiplicand factor set up through the windows $G^{11}$ in the top of casing A. The end of the shaft $G^9$ which carries the gear $E^3$ is journaled in a bearing block $G^{12}$ and this block moves along a slot in the rail $G^{13}$ to support that end of the shaft whatever position the gear may have. The journaled pedestals $G^{14}$ are provided for supporting the shafts $G^9$ where desired. (See Figs. 5 and 18).

The five disks E with their slots accurately in angular alinement are fastened on a common shaft $E^4$, which is of sufficiently small diameter to allow the respective gears $E^3$ to engage the innermost circle comprising only the ten slots. This shaft $E^4$ is in axial alinement with the shaft $E^5$ and is connected thereto by reversing gearing hereinafter described. Nine stopping ratchets $E^6$ are mounted on the shaft $E^5$ and are associated with control devices to effect one-tenth to nine-tenths of a complete rotation of the shafts $E^4$ and $E^5$ in accordance with the multiplier digits 1 to 9. (Figs. 3, 6, 7, and 9.) Each ratchet is provided with ten teeth and with a pin abutment $E^7$. The disks $E^8$ have projections $E^9$ of different angular extent which are arranged to strike against the abutments $E^7$ of the respective ratchets $E^6$. All the disks $E^8$ are tight on the shaft $E^5$, whereas the ratchets $E^6$ are loose on the shaft, and each disk is connected to its ratchet by a coil spring $E^{10}$. When a multiplier key H is depressed, the corresponding ratchet $E^6$ is held against rotation, while its disk $E^8$ is rotated by the shaft $E^5$ until the projection $E^9$ strikes against the back of the abutment $E^7$ and thereby prevents further movement of the shaft, the amount of rotation thus depending upon the angular extent of the projection and the abutment. Since the spring $E^{10}$ is wound up during this movement of the disk, the ratchet will, when released, be brought by the spring to its normal position shown in Fig. 9, wherein the front of the abutment lies against the projection. In Fig. 9, the ratchet $E^6$ and disk $E^8$ for nine-tenths of a rotation are shown in their normal position, the projection $E^9$ and the pin $E^7$ occupying the remaining one-tenth of the circumference. The other ratchets and disks are like this one except that the projections $E^9$ have the angular extent determined by the amount of rotation to be permitted in each case. The shaft $E^4$ with the disks E and the shaft $E^5$ with the stopping device are turned by a spring motor which will be described hereinafter.

The mechanism associated with the stopping devices to control the rotation of the disks E comprise a multiplier keyboard having five banks H of keys, 1 to 9, and nine shiftable bars $H^1$ operated thereby and suitably supported, together with the devices for releasing the spring motor. (See Figs. 1, 3, 6, 7, 9 and 12.) The bank H of highest denomination is arranged at the left of the multiplier keyboard while the remaining banks decrease in denomination toward the right in Fig. 1. Each bank is provided with a longitudinally shiftable bar $H^2$ for connecting the variable-ratio gearings with a series of indicators in accordance with the denomination of the multiplier digit, as will be described hereinafter, and each of these bars is arranged to be operated upon depression of any multiplier key in the bank before the spring motor is released thereby. The shank of each multiplier key carries two offset parts $H^3$ and $H^4$ at right angles to each other, the part $H^3$ having a tapered bottom adapted to shift the corresponding bar $H^2$ forward during the first part of the depression stroke, and the part $H^4$ having a tapered bottom adapted to move to the right in Fig. 6, during the later part of the depression stroke, that bar $H^1$ which corresponds to the digit represented by the key. In this way, the shiftable bar $H^2$ corresponding to the denomination of the multiplier digit but irrespective of its value is first moved and then the shiftable bar $H^1$ corresponding to the value of the multiplier digit but irrespective of its denomination is then moved. The springs $H^5$ restore the individual keys to their normally raised position determined by a shoulder on the part $H^3$ of the key shank and the cover of the casing A.

Locking means are provided to prevent the simultaneous depression of two or more multiplier keys of different banks. (See Figs. 4, 16 and 17). The mechanism for the purpose comprises a plurality of balls $H^6$ arranged in a traverse race $H^{20}$ between the screws $H^7$, the balls having the proper size relative to spacing of the shiftable bars $H^2$ and being so arranged that the end $H^8$ of any one bar $H^2$ may enter between the balls through an opening in the race, but no more than one at a time. In this way the variable-ratio gearings cannot be connected to more than one series of indicators at a time, and a multiplier key of one bank cannot be depressed before a depressed key of another bank is restored. The springs $H^9$ return the bars $H^2$ to their normal position when the multiplier keys are released. The bars $H^1$ have slots $H^{10}$ through which extend stationary guide pins $H^{11}$, and are provided with springs $H^{12}$ for returning the bars to normal position after actuation. The tapered bottom of the part $H^4$ of each multiplier key and the engaging fingers $H^{13}$ are so arranged that the bar $H^1$ reaches its extreme right hand position in Fig. 6 in engagement with the corresponding ratchet $E^6$ near the end of the depression stroke of the key. Each of the bars $H^1$ is also provided with a depending pin $H^{14}$ engaging a slot in a pivoted frame $H^{15}$ provided with a spring $H^{16}$ tending to keep it in the normal position shown in Fig. 9. This frame carries a lever $H^{17}$ (see Fig. 7) having a shaped end which engages and positions the gear $H^{18}$ to lock the spring motor until a multiplier key is fully depressed, but which unlocks the gear to permit rotation of the disks E when the pivoted frame $H^{15}$ is moved far enough by the pin and slot connection. However, the shiftable bar $H^1$ is moved into full engagement with the ratchet $E^6$ on the down stroke of a multiplier key before the gear $H^{18}$ is released, and also the gear is fully locked on the up stroke before the ratchet is released, so that the shafts $E^4$, $E^5$ are either locked against rotation or else their rotation is controlled at all times.

A spring motor is provided for rotating the shafts $E^4$, $E^5$ upon depression of the multiplier keys. (See Figs. 3, 4, 6 and 7). It comprises a spiral spring J, with its inner end fastened to the shaft $J^1$ and its outer end fastened to the frame of the machine. The gear $J^2$ carries the spring pressed pawl $J^3$, and is loose on the shaft $J^1$ but meshed with the gear $J^4$. This gear $J^4$ is fastened on the shaft $J^5$ and the bevel gear $J^6$ is likewise fastened on this shaft in engagement with the bevel gear $J^7$ on the shaft $E^5$. When the spring motor J unwinds, the gear $J^2$ and the shaft $E^5$ are turned in the direction of the arrows until stopped by the stopping devices previously described. The mechanism for winding the spring motor comprises a handle $J^8$ tight on the shaft $J^9$, and a toothed segment $J^{10}$ loose on the shaft and carrying a pin abutment $J^{11}$ adapted to be engaged by the handle. The teeth of the segment are in mesh with a gear $J^{12}$ to which is fastened a ratchet $J^{13}$ tight on the shaft $J^1$. When the handle is pulled in the direction of the arrow in Fig. 4, it strikes against the abutment $J^{11}$, and then rotates the ratchet $J^{13}$ to wind the spring J from the position to which it previously unwound to a fully wound position, the gear $J^2$ being locked from the shaft $E^5$. The spring $J^{14}$ returns the handle when it is released by the operator. The spring motor J has sufficient strength and the gearing interposed between the spring and the shafts $E^5$ is suitable for rotating the shafts $E^4$ and $E^5$ through the number of revolutions required for the various calculations.

In addition and multiplication, the disks E are rotated in the direction of the arrow in Fig. 18 and the stopping devices on the shaft $E^5$ are rotated in the same direction, but for subtraction and division the direction of rotation of the disks E is reversed while that of the shaft $E^5$ remains as before. When the handle K is in the position shown in Fig. 1, indicating addition and multiplication, the ten-tooth clutch members $K^1$ are engaged while the gear $K^2$ slidably mounted in a keyway on the shaft $E^5$ is out of mesh with the gear $K^3$ which is loose on the stud $K^9$. (See Figs. 3 and 18). However, when the handle K is moved to indicate subtraction and division, the clutch members $K^1$ are disengaged by means of the pivoted arm $K^4$ which carries a finger engaging the collar of that clutch member which slides in a keyway on the shaft $E^5$, while the gears $K^2$ and $K^3$ become engaged at the same time. The gears, $K^5$, $K^6$ and $K^7$ are permanently in engagement, and since $K^5$ is fastened to $K^3$ while $K^7$ is fast on the shaft $E^4$, the direction of rotation of the disks E is then opposite to that of the shaft $E^5$ on which the controlling disks are mounted. The arrangement is such that the gears $K^2$ and $K^3$ are completely disengaged only when the clutch members $K^1$ are completely engaged, and vice versa, so that the spring motor can only be released by depression of a multiplier key. A pin projecting from the lever $K^4$ engages a spring finger $K^8$ to hold the handle K in one position or the other.

The digits set up by the keys H are indicated on the multiplier indicators L to show the multiplier factor through the windows $L^1$ in the cover of the casing A. (See Figs. 1, 3, 4, 7, 8 and 12). The indicators have two series of digits 0 to 9 disposed consecutively around the periphery. The indicators L are loosely mounted on the shaft $L^2$ and are normally held in position by the engagement of the spring fingers $L^3$ and the mutilated gears $L^4$ fastened to the indicators. The bevel gear $L^5$ is fast on the shaft $L^2$ and the engaging bevel gear $L^6$ is fast on the shaft $L^7$ which is driven by the gearing $L^8$ from the shaft $E^4$. The arrangement is such that the shaft $L^2$ turns one-tenth of a rotation while the disks E turn through one sector, and the direction of rotation is such as to turn the larger figures on the indicators L from 1 to 9 when the disks turn in the direction of the arrow in Fig. 7 for addition and multiplication, while the smaller figures turn from 1 to 9 when the disks turn in opposite direction for substraction and division. Each indicator L carries a ten-tooth clutch member $L^9$, while the coöperating clutch members $L^{10}$, slidably mounted in keyways on the shaft $L^2$, are adapted to engage therewith at any position of rest to turn the individual indicators when the disks are turned. The coöperating clutch members of each denomination are engaged when the bar $H^2$ is moved by a multiplier key in the corresponding bank to connect the dial L to the shaft $L^2$, thereby causing it to turn to indicate the number of sectors through which the disks E are turned, which corresponds to the value of the multiplier digit. The means for engaging the clutch members comprise the obliquely extending slots $L^{11}$ in the bars $H^2$, which engage individual pins $L^{12}$ and turn them about their pivots $L^{18}$ to slide the coöperating clutch members into engagement. As soon as the multiplier key is released the bar $H^2$ moves away and the clutch members become disengaged.

The gears $E^3$ are fastened on individual shafts M, which extend across the machine. (See Figs. 3, 5 and 18.) Each of these shafts is provided with a keyway $M^1$ and is mounted in a hollow shaft $M^2$. There are five spiral gears $M^3$, corresponding to the five multiplier digits provided for, loosely mounted between collars on each hollow shaft. The spiral gears on each shaft are arranged opposite five adjacent indicator shafts $B^1$, but those gears on adjacent shafts are indented or offset in denomination in such manner that the gears in the right hand oblique line in Fig. 3 are opposite the series of indicator shafts of lowest denomination, that is of units, tens, hundreds, thousands and ten-thousands denomination; the gears in the second oblique line from the right being opposite the series of indicator shafts comprising the tens denomination to the hundred-thousands denomination; the gears of the third oblique line being opposite the hundreds to the millions denomination; the fourth being opposite the thousands to the ten-millions denomination; and the fifth from the right, or the first from the left, being opposite the series of indicator shafts of highest denomination comprising the ten-thousands to the hundred-millions denomination. In each oblique line the spiral gear actuated by the disk E of highest denomination is opposite the indicator shaft of the highest denomination of the series, while the other spiral gears of each series are opposite the indicator shafts of correspondingly lower denominations. Each spiral gear carries a ten-tooth clutch member $M^4$ with which a coöperating clutch member $M^5$ is adapted to engage. Each of the clutch members $M^5$ is provided with a collar, and with a pin which extends into the keyway $M^1$ in the shaft M, so that the clutch member is slidable into and out of engagement with the clutch member $M^4$, and is adapted at all times to turn with the shaft M. Thus when a gear $E^3$ is turned by the disk E, the five corresponding clutch members $M^5$ are turned, while that one of the five spiral gears $M^3$ which is connected by the coöperating clutch members is turned through the same angular extent. The spiral gears $M^6$ are fast on the individual indicator shafts $B^1$ and engage the corresponding spiral gears $M^3$, the gear ratio being unity.

Each shiftable bar $H^2$ has a diagonal slot $M^7$ into which extends a pin $M^8$ projecting from a diagonal bar $M^9$ which is arranged to be guided in a transverse movement of parallel translation by the stationary pins $M^{10}$ engaging with transverse slots therein. (See Fig. 4.) Each diagonal bar $M^9$ has five fingers $M^{11}$ adapted to engage the collars of the five clutch members $M^5$ corresponding to one series of indicator shafts $B^1$. The arrangement is such that when any multiplier key H of a bank is depressed, the corresponding diagonal bar $M^9$ connects the gears $E^3$ with the series of indicators corresponding to the denomination of the multiplier digit. The forward end of each diagonal bar $M^9$ is provided with a finger $M^{12}$ arranged to depress the lock $B^{17}$ of its denomination in moving across the inclined top surface, and thereby depress all those of lower denomination as well, so that all the indicator shafts $B^1$ engaged by the multiplying mechanism are free to be turned while the indicator shafts of higher denomination remain locked against rotation. (See Fig. 17).

The rectifier shafts D and $D^1$ are each turned through one complete rotation after each partial result is registered on the adding and accumulating mechanisms during each actuation of the driving mechanism, whether the disks E be turned through one or any other number of sectors (Figs. 3, 9, 10, 11, 14 and 16.) The spring P has its outer end fastened at $P^1$ to a stationary post, while its inner end is fastened to a sleeve tight on the shaft $P^2$ to which are also fastened the gear $P^3$ and the ratchet $P^4$, the latter being engaged by the spring pressed pawl $P^5$ carried by the gear $P^6$. The segment $P^7$ pivoted at $P^8$ engages the gear $P^3$ and also projects within the path of the pins $P^9$ on the disk $P^{10}$ fastened on the shaft $E^5$. During the end portion of the downstroke of a multiplier key, the frame $H^{16}$ is swung to the right in Fig. 9, and the shaped end of the arm $P^{11}$ moved thereby slides from underneath the shaped end of the pivoted member $P^{20}$ and takes the position shown in dotted lines in Fig. 9. When the shaft $E^5$ rotates, the disks E turning in one direction or the other, that pin $P^{10}$ then in contact with the arm of segment $P^7$ forces the arm to the dotted position and thereby winds the spring P. However, as soon as the multiplier key is released, the frame $H^{15}$ returns to the position shown in Fig. 9, and the finger $P^{11}$ being forced down to the position shown in full lines, causes the pin $P^{12}$ to trip the spring-pressed pawl $P^{13}$ and allow the spring P to unwind until the arm of segment $P^7$ is brought to the position shown in full lines in contact with a pin $P^9$. During this time, the gear $P^6$ and the engaging gears $P^{14}$ and $P^{15}$ are turned the amount required to effect one rotation of the rectifier shaft D in the direction indicated in Fig. 10, by means of the engaging bevel gears $P^{16}$. The rectifier shaft $D^1$ is turned in the same direction as D through the pairs of spiral gears $P^{17}$ and $P^{18}$, one gear of the latter pair being slidably mounted in a keyway in the shaft $P^{19}$ so as to remain in engagement with the coöperating gear of the pair when the adding mechanism is disengaged from the accumulating mechanism in clearing, as will be noted hereinafter.

The indicators of the adding mechanism, the multiplicand indicators, and the multiplier indicators are cleared or reset to 0, while the spring motor is being wound. (Figs. 2, 3, 4, 7, 12, 14, 15 and 16.) The bevel gear S is carried by the handle $J^8$, and is in engagement with a bevel gear $S^1$ tight on the shaft $S^2$, which also carries the bevel gear $S^3$ and the cams $S^4$ and $S^5$. The full movement of the handle $J^8$ effects sufficient rotation of the shafts $S^2$ and of $S^6$, which carries the five mutilated gears $S^{26}$ engaging the gears $L^4$ carried by the multiplier indicators L, to thereby reset the indicators to 0, from any position which they may have had, the teeth of the gears $S^{26}$ coming into the cutout places of the gears $L^4$ when the indicators L show 0, as will be understood from the well known method of operation of mutilated gears and racks for this purpose. At the same time, the cam $S^4$ forces the slidable bar $S^8$ with the inclined fingers $S^9$ against the locking bars $G^7$, shifting them forward until the cut out places are opposite the shanks of the multiplicand keys to release all those which may be locked in depressed position. The springs $S^{10}$ return the bars $G^7$ to their normal position during the latter part of the rotation of the cam $S^4$. In clearing the indicators $B^6$, the adding mechanism is first pushed away from the accumulating mechanism to disengage the clutch members C so that the indicators $B^6$ of the accumulating mechanism will not be cleared at the same time. The cam $S^5$ strikes the roller $S^{12}$ carried by the bar $S^{13}$, moving the inclined surfaces $S^{14}$ of the bar against the separating cams $S^{15}$ on the frame of the adding mechanism in the direction of the arrow in Fig. 4 to force back the adding mechanism against the stress of the springs $S^{11}$. The bar $S^{13}$ is held in this position by the cam $S^5$ and roller $S^{12}$ while the mutilated gear $S^{16}$ which is slidably mounted in a keyway in the shaft $S^2$ in engagement with teeth on the bottom of one of the rack bars $S^{17}$ in the direction of the arrow in Fig. 4 far enough to clear the indicators $B^6$ of the adding mechanism by engaging the mutilated gears $S^{18}$ fastened to the indicators. The return stroke of the handle $J^8$ restores the rack bars to normal position, and the spring $S^{25}$ then returns the bar $S^{13}$ to permit reëngagement of the clutch members C. To clear the indicators $B^6$ of the accumulating mechanism, the knob $S^{19}$ is pressed, thereby moving the bar $S^{13}$ to first disengage the adding mechanism in the manner described above and to unlock the indicator shafts $B^1$ by reason of the engagement of the finger $S^{23}$ with the toe $S^{24}$ of the lock $B^{17}$ of highest denomination. (See Fig. 17). At the end of this operation, the projections $S^{20}$ engage the abutments $S^{21}$ on one of the rack bars $S^{22}$ and thereafter these rack bars are moved in the direction of the arrow in Fig. 4 to engage the mutilated gears $S^{18}$ on the indicators of the accumulating mechanism, the two mechanisms remaining disengaged and the shafts $B^1$ remaining unlocked. As soon as the knob $S^{19}$ is released, the spring $S^{25}$ restores the parts to their normal position.

The method of multiplying any two factors, as 74092 by 51803 for instance, will now be described. All the indicators being cleared and the handle K being set to multiplication, the multiplicand keys of the proper value and denomination, excepting the 0 key of hundreds denomination, are fully depressed in any order and either successively or in groups. The gears $E^3$ are positioned and the multiplicand factor 74092 appears on the multiplicand indicators, while the depressed keys are held down. The multiplier keys are then fully depressed successively in any order. If the key of highest denomination having the value of 5 is depressed first, the gears $E^3$ are first operatively connected with the series of indicators $B^6$ corresponding to the highest denomination. Upon further depression of the multiplier key, the disks E are turned through five sectors. The gear $E^3$ of highest denomination is turned through 35 teeth, the next gear through 20 teeth, the next gear through 0 teeth, the next gear through 45 teeth, and the gear of lowest denomination through 10 teeth, while the indicators $B^6$ of the adding and accumulating mechanisms will be turned through the same number of digits, respectively, the units being transferred to next higher denominations simultaneously with the adding movements. When the disks are stopped by the stopping devices, the multiplier key is released, the indicators of the adding and accumulating mechanisms are rectified and each mechanism will then indicate the product of 74092 and 50,000 or 3,704,600,000. The machine is then ready for the next multiplier digit, the multiplicand setting remaining as before and the multiplier digit 5 being shown on the multiplier indicator of highest denomination. The multiplier key 1 of the thousands denomination may then be depressed and the machine will operate as before, excepting that the disks will be turned through one sector and the partial result 74092 will be registered on the series of indicators corresponding to the second highest denomination and will be added to the previous partial result on the adding and accumulating mechanisms to indicate thereon 3,778,692,000, which is the producct of 74092 and 51000. The other multiplier digits are then set up in like manner, the digit 0 of tens denomination not requiring the depression of a key. At the end of the operation 74092 will be shown on the multiplicand indicators, 51803 will be shown on the multiplier indicators, and their product 3,838,187,876 will be shown on the adding mechanism and also on the accumulating mechanism.

Any one or more of the multiplier digits may be changed and the new product will be immediately indicated. Thus if it is desired to change the digit 8 in the multiplier of the last example to 9, the multiplier key 1 in the hundreds bank is depressed, and the adding and accumulating mechanisms will then each show 3,845,597,076, which is the product of the multiplicand 74092 and the new multiplier 51,903, the latter being shown on the multiplier indicators. To decrease any one of the multiplier digits, the handle K is set to indicate subtraction and division, whereby the direction of rotation of the disks will be reversed, the rotation of the shaft $E^5$, however, having the same direction as before. Thus, to change the multiplier digit 9 back to 8, the 1 key in the same column is then depressed, and the multiplier indicators will again show 51,803, while the adding and accumulating mechanisms will again indicate the previous product 3,838,187,876.

If the product of any factors, as 6296 and 387, for instance, is now to be found and also added to the previous products the lever $J^8$ is actuated to reset the multiplicand indicators to 0, together with the gears $E^3$, the multiplier indicators, and the indicators of the adding mechanism. However, the indicators of the accumulating mechanism will remain in the position to which they were previously actuated, showing 3,838,187,876. The new multiplicand 6296, and the multiplier 387 are set up as before. These factors will then be shown on the multiplicand and multiplier indicators, while their product 2,436,552 will be shown on the adding mechanism, and the sum of the two products, or 3,840,624,428 will be shown on the accumulating mechanism.

Addition is performed as follows: The machine being entirely cleared, the handle K set to addition, the first item is set up on the multiplicand key board, and the 1 key of the multiplier bank of units denomination is depressed, whereupon the first number appears on the adding and accumulating mechanisms, while 1 is indicated by the multiplier dial of units denomination. The next item is then set up after the previously depressed keys have been released by striking the 0 keys of the different banks. The multiplier key 1 of units denomination is then depressed as before, and the new item is added to the first one both on the adding and accumulating mechanisms. This process may be continued as far as desired within the capacity of the machine, the multiplier indicator of units denomination always indicating the units of the number of items added. Sub-totals may be taken off, the adding mechanism being cleared after each one is ascertained by pulling the handle $J^8$, and the grand total being shown at all times on the accumulating mechanism, which may be cleared by pushing the knob $S^{19}$. An item may be subtracted at any time from the sums on the adding and accumulating mechanisms by throwing the handle K over to the subtraction, setting the number to be subtracted, on the multiplicand key board, and then depressing the multiplier key 1 of units denomination.

Division may be performed as follows: The handle K is set to addition, the dividend is set up on the multiplicand keyboard, and the mutliplier key 1 of highest denomination is depressed, whereupon the dividend will appear on the adding and accumulating mechanisms. If the dividend contains more than five digits, the five digits of highest denomination are registered in the manner noted, and then the remaining digits are set up on the multiplicand keyboard, starting with the bank of second highest denomination, and depressing the multiplier key 1 of lowest denomination, whereupon the complete dividend will appear on the adding and accumulating mechanisms, with the first digit of the dividend showing on the indicators of second highest denomination and with zeros following the digit of lowest denomination in the dividend. The multiplicand indicators, the multiplier indicators, and the indicators of the adding mechanism are then cleared by pulling the handle $J^8$, the dividend remaining on the accumulating mechanism. The handle K is then thrown over to division, the divisor is set up on the multiplicand key board, starting with the bank of proper denomination, and then the multiplier key 1 of proper denomination is depressed again and again until the divisor just becomes greater than the number given by the same number of digits of highest denomination on the accumulating mechanism. This process is repeated using the multiplier key 1 of the proper bank each time. The divisor remains on the multiplicand indicators, the quotient is shown by the smaller figures on the multiplier indicators, and the remainder appears on the accumulating mechanism.

The method of performing subtraction will now be apparent from the operations described above. The minuend is set up on the adding and accumulating mechanisms as in division using the multiplier key 1 of units denomination. The handle K is then set to subtraction, the subtrahend is set up on the multiplicand keyboard, and the multiplier key 1 of units denomination is depressed, whereupon the difference will be shown.

Having thus described our invention, what we claim is:

1. In a multiplying machine, the combination with an adding mechanism comprising a plurality of indicators and transfer devices therefor, and a driving mechanism for registering the products of digits on the adding mechanism, of means for connecting the driving mechanism with a different series of said indicators for each denomination of the multiplier to register said products in proper denominational relation on the adding mechanism to indicate thereon the product of a multiplicand and multiplier having any number of digits up to the number provided for; substantially as described.

2. In a multiplying machine, the combination with a non-indenting adding mechanism comprising a plurality of indicators and transfer devices therefor, and a multiplying mechanism comprising a plurality of non-indenting driving mechanisms for registering the products of digits on the adding mechanism, of means for connecting the multiplying mechanism with a different series of said indicators for each denomination of the multiplier to register said products in proper denominational relation on the adding mechanism to indicate thereon the product of a multiplicand and multiplier having any number of digits up to the number provided for; substantially as described.

3. In a multiplying machine, the combination with a non-indenting adding mechanism comprising a plurality of indicators and transfer devices therefor, and a multiplying mechanism comprising a plurality of driving mechanisms arranged in constant connective relation with different series of said indicators and adapted to register the products of digits on the adding mechanism, of means for operatively connecting the series of driving mechanisms with a different series of said indicators for each denomination of the multiplier to register said products in proper denominational relation on the adding mechanism to indicate thereon the product of a multiplicand and multiplier having any number of digits up to the number provided for; substantially as described.

4. In a multiplying machine, the combination with a non-indenting adding mechanism comprising a plurality of indicators and transfer devices therefor, a series of non-indenting driving mechanisms, and means for predetermining the actuation effected by each driving mechanism in accordance with the product of a multiplicand digit and a multiplier digit, of means for connecting the series of driving mechanisms with a different series of indicators for each denomination of the multiplier to register the products in proper denominational relation on the adding mechanism to indicate thereon the product of a multiplicand and multiplier having any number of digits up to the number provided for; substantially as described.

5. In a multiplying machine, the combination with a non-indenting adding mechanism comprising a plurality of indicators and transfer devices therefor, a series of non-indenting variable-ratio gearings, and means for actuating the gearings, of means for connecting the series of gearings with a different series of indicators for each denomination of the multiplier to register the products of digits in proper denominational relation on the adding mechanism to indicate thereon the product of a multiplicand and multiplier having any number of digits up to the number provided for; substantially as described.

6. In a multiplying machine, a non-indenting adding mechanism comprising a plurality of indicators and transfer devices therefor, a series of driving mechanisms arranged in constant connective relation with the indicators and adapted to register the products of digits on the adding mechanism, and selectors for operatively connecting the series of driving mechanisms with different series of the indicators for the different denominations of the multiplier to register said products in proper denominational relation on the adding mechanism to indicate thereon the product of a multiplicand and multiplier having any number of digits up to the number provided for; substantially as described.

7. In a multiplying machine, a non-indenting adding mechanism comprising a plurality of indicators and transfer devices therefor, a series of driving mechanisms equal in number to the number of multiplicand digits provided for wherein each driving mechanism is adapted to register the product of digits on the adding mechanism, and a number of selectors equal to the number of multiplier digits provided for wherein each selector is adapted to connect the series of driving mechanisms with a different series of indicators to register said products in proper denominational relation on the adding mechanism to indicate thereon the product of a multiplicand and multiplier having any number of digits up to the number provided for; substantially as described.

8. In a multiplying machine, a non-indenting adding mechanism comprising a plurality of indicators and transfer devices therefor, a series of driving mechanisms equal in number to the number of the multiplicand digits provided for and arranged in constant connective relation with the indicators, and means for operatively connecting the driving mechanisms with a different series of indicators for each denomination of the multiplier to register the products of digits in proper denominational relation on the adding mechanism to indicate thereon the product of a multiplicand and multiplier having any number of digits up to the number provided for; substantially as described.

9. In a multiplying machine, a non-indenting adding mechanism comprising a plurality of indicators and transfer devices therefor, a series of variable-ratio gearings equal in number to the number of multiplicand digits provided for wherein each gearing is arranged in constant connective relation with a number of indicators equal to the number of multiplier digits provided for, means for actuating the gearings, and means for operatively connecting each gearing with a different indicator for each denomination of the multiplier to register the products of digits in proper denominational relation on the adding mechanism to indicate thereon the product of a multiplicand and multiplier having any number of digits up to the number provided for; substantially as described.

10. In a multiplying machine, an adding mechanism having a plurality of indicators provided with receiving members, a plurality of driving mechanisms provided with actuating members for registering the products of digits on the adding mechanism, said actuating members crossing said receiving members and being arranged in constant connective relation therewith at certain crossing points, and selecting mechanism for operatively connecting said actuating members with a different series of said receiving members for the different denominations of the multiplier to register the products of digits in proper denominational relation on the adding mechanism to indicate thereon the product of a multiplicand and multiplier having any number of digits up to the number provided for; substantially as described.

11. In a multiplying machine, an adding mechanism having a plurality of indicators provided each with a receiving member, a plurality of variable-ratio gearings provided each with an actuating member, the actuating members crossing the receiving members and being arranged in constant connective relation therewith at certain crossing points, means for actuating the gearings, selectors for operatively connecting the actuating members with a different series of receiving members for each denomination of the multiplier to register the products of digits in proper denominational relation on the adding mechanism to indicate thereon the product of a multiplicand and multiplier having any number of digits up to the number provided for; substantially as described.

12. In a multiplying machine, an adding mechanism having a plurality of indicators provided each with a receiving member, a number of driving mechanisms equal to the number of multiplicand digits provided for wherein each driving mechanism is provided with an actuating member arranged across and in constant connective relation with a number of receiving members equal to the number of multiplier digits provided for, and a selector for each denomination of the multiplier for operatively connecting the actuating members with a different series of receiving members to register the products of digits in proper denominational relation on the adding mechanism to indicate thereon the product of a multiplicand and multiplier having any number of digits up to the number provided for; substantially as described.

13. In a multiplying machine, an adding mechanism having a plurality of indicators provided each with a receiving member, a number of driving mechanisms equal to the number of multiplicand digits provided for wherein each driving mechanism is provided with an actuating member extending across a number of receiving members equal to the number of multiplier digits provided for, meshed gearing at certain crossing points comprising one gear fast and the other gear loose on the respective members, and a selector for each denomination of the multiplier for operatively connecting certain ones of the loosely mounted gears to their members to register the products of digits in proper denominational relation on the adding mechanism to indicate thereon the product of a multiplicand and multiplier having any number of digits up to the number provided for; substantially as described.

14. In a calculating machine, an adding mechanism comprising a plurality of indicators and transfer devices therefor, a driving mechanism including a positively-engaged gearing adapted to register the product of any digits 1 to 9 on the adding mechanism and to be meshed in positive engagement at all times, and transmitting connections between the gearing and the adding mechanism; substantially as described.

15. In a calculating machine, an adding mechanism comprising a plurality of indicators and transfer devices therefor, a plurality of positively-engaged variable-ratio gearings each adapted to register the product of any digits 1 to 9 on the adding mechanism and to be meshed at all times during such operation, transmitting connections between the gearings and the adding mechanism, and means for actuating the gearings; substantially as described.

16. In a calculating machine, an adding mechanism comprising a plurality of indicators and transfer devices therefor, a number of positively-engaged variable-ratio gearings equal to the number of multiplicand digits provided for wherein each gearing is adapted to register the product of any digits 1 to 9 on the adding mechanism and to be meshed at all times during such operation, setting devices for predetermining the actuation of the adding mechanism effected by each gearing in accordance with the digits of the multiplicand, transmitting connection between the gearings and the adding mechanism, and means for actuating the gearings in accordance with each digit of the multiplier; substantially as described.

17. In a calculating machine, an adding mechanism comprising a plurality of indicators and transfer devices therefor; a plurality of variable-ratio gearings each comprising a disk having actuating means arranged in circular arcs containing numbers thereof proportional to the digits 1 to 9, and a device registering with said actuating means and adapted to be positioned to any one of said arcs to set up a multiplicand digit; transmitting connections between the gearings and the adding mechanism; and means for actuating the gearings in accordance with each digit of the multiplier for registering the products of the separate multiplicand and multiplier digits on the adding mechanism; substantially as described.

18. In a calculating machine; an adding mechanism comprising a plurality of indicators and transfer devices therefor; a plurality of disks each having actuating means arranged in circular arcs containing numbers thereof proportional to the digits 1 to 9; a gear for each disk adapted to be positioned to any one of said arcs to set up a multiplicand digit; transmitting connections from the gears to the adding mechanisms; and means for actuating the disks in accordance with each digit of the multiplier for registering the products of the separate multiplicand and multiplier digits on the adding mechanism; substantially as described.

19. In a calculating machine; an adding mechanism comprising a plurality of indicators and transfer devices therefor; a plurality of disks each having radially-disposed slots and other actuating means therebetween disposed in circular arcs containing a number thereof increasing from the center of the disk: a gear for each disk having teeth adapted to slide along any of said slots to position the gear in accordance with a multiplicand digit, and also to continually mesh with the slots and the other actuating means so as to be positively engaged thereby at all times; transmitting connections from the gears to the adding mechanism; and means for actuating the disks in accordance with each multiplier digit for registering the products of the separate multiplicand and multiplier digits on the adding mechanism; substantially as described.

20. In a calculating machine; an adding mechanism comprising a plurality of indicators and transfer devices therefor; a plurality of disks each having actuating means comprising radially-disposed slots forming sectors thereon, and indentations disposed in circular arcs between the slots, the arrangement being such that each sector has nine arcs of actuating means containing numbers thereof, including one slot in each case, proportional to the digits 1 to 9; a gear for each disk having teeth adapted to slide along any of the slots to position the gear in accordance with a multiplicand digit, and also to continually mesh with the slots and indentations so as to be positively engaged thereby at all times; transmitting connections from the gears to the adding mechanism; and means for actuating the disks in accordance with a multiplier digit to actuate each gear in accordance with the product of the multiplicand digit set up thereby and the multiplier digit; substantially as described.

21. In a calculating machine; an adding mechanism comprising a plurality of indicators and transfer devices therefor; a plurality of disks each having more than eight radially-disposed slots extending to the outer periphery of the disk to form sectors thereon, and holes disposed in circular arcs between the slots, the arrangement being such that each sector has an innermost arc containing one slot alone, the next arc containing one slot and one hole, the third arc containing one slot and two holes, and so on to the outermost arc which contains one slot and eight holes; a gear for each disk having teeth adapted to slide along the slots to position the gear in accordance with a multiplicand digit; transmitting connections from the gears to the adding mechanism; and means for turning the disks through 1 to 9 sectors in accordance with a multiplier digit to actuate each gear in accordance with the product of the multiplicand digit set up thereby and the multiplier digit; substantially as described.

22. In a calculating machine, an adding mechanism comprising a plurality of indicators and transfer devices therefor, a plurality of disks having actuating means arranged in circular arcs containing different numbers thereof, said disks being mounted fast on a common shaft, a registering device for each disk adapted to be positioned relatively to the actuating means thereon in accordance with a multiplicand digit, transmitting connections from the gears to the adding mechanism, and means for turning said shaft in accordance with a multiplier digit to register the products of the separate multiplicand and multiplier digits on the adding mechanism; substantially as described.

23. In a calculating machine, an adding mechanism comprising a plurality of indicators and transfer devices therefor, a plurality of disks having radially-disposed slots and other actuating means therebetween, said disks being mounted fast on a common shaft with their slots in angular alinement, a gear for each disk adapted to slide along the slots to be positioned therein in accordance with a multiplicand digit, transmitting connections from the gears to the adding mechanism, and means for turning said shaft through the angular separation of a number of the slots proportional to a multiplier digit, the arrangement being such that the gears may slide along the slots at any position of rest of the disks; substantially as described.

24. In a calculating machine, the combination with a differential adding mechanism, of a multiplying mechanism comprising a rotatable multiplying member, a gear wheel coöperative with a driving component of the adding mechanism and designed to be moved into engagement with the multiplying member to set up the multiplicand digits 1 to 9, respectively, and a lock designed to be engaged by the gear wheel to set up 0 and lock the gear wheel and said driving component against rotation during rotation of the multiplying member; substantially as described.

25. In a calculating machine, the combination with a differential adding mechanism, of a multiplying mechanism comprising a rotatable multiplying member, a gear wheel coöperative with a driving component of the adding mechanism and designed to be moved into engagement with the multiplying member to set up the multiplicand digits 1 to 9, respectively, and a lock designed to be engaged by the gear wheel to set up 0 and lock the gear wheel and said driving component against rotation during rotation of the multiplying member, said gear wheel engaging said lock while disengaging the multiplying member and vice versa; substantially as described.

26. In a calculating machine, an adding mechanism comprising a plurality of indicators and transfer devices therefor, a plurality of driving mechanisms for registering the products of digits on the adding mechanism wherein each driving mechanism includes a gear adapted to be positioned relatively to the actuating means therefor, rotatable shafts on which the gears are individually fastened, setting means for independently moving the rotatably shafts axially to position the individual gears in accordance with the separate digits of a number, and connections from the rotatable shafts to the adding mechanism to drive the indicators thereof from the driving mechanism; substantially as described.

27. In a calculating machine, an adding mechanism comprising a plurality of indicators and transfer devices therefor, a plurality of driving mechanisms for registering the products of digits on the adding mechanism wherein each driving mechanism includes a gear adapted to be positioned relatively to the actuating means therefor, rotatable shafts on which the individual gears are fastened, hollow shafts inclosing said rotatable shafts and turned thereby at all positions of the respective gears, setting means for independently moving said rotatable shafts axially through the hollow shafts to position the individual gears in accordance with the separate digits of a number, and connections from the hollow shafts to the adding mechanism to drive the indicators thereof from the driving mechanism; substantially as described.

28. In a calculating machine, an adding mechanism comprising a plurality of indicators and transfer devices therefor; a plurality of driving mechanisms for registering the products of digits on the adding mechanism, wherein each driving mechanism includes a gear adapted to be positioned relatively to the actuating means therefor; rotatable shafts on which the individual gears are fastened; setting means for independently moving the rotatable shafts axially to position the individual gears in accordance with the separate digits of a number; said setting means comprising a bank of keys for each denomination of the multiplicand, a shaft for each bank actuated in accordance with the value of the key depressed in that bank, and gearing interposed between the last named shafts and the rotatable shafts of corresponding denomination; and connections from the rotatable shafts to the adding mechanism to actuate the indicators thereof from the driving mechanism, substantially as described.

29. In a calculating machine; an adding mechanism; actuating gearing therefor; and a controlling mechanism comprising a member carrying a stop rotatable independently of the actuating gearing, a lock engageable with said member to hold it against rotation upon rotation of the actuating gearing, a second member carrying a coöperative stop rotatable with the actuating gearing and designed to engage the other stop upon completion of a predetermined amount of rotation, and lock mechanism designed to release the actuating gearing when the independently rotatable member is engaged by its lock and to lock the actuating gearing when that member is disengaged; substantially as described.

30. In a calculating machine, an adding mechanism comprising a plurality of indicators and transfer devices therefor; actuating gearing for registering the products of digits on the adding mechanism; controlling mechanism connected to the actuating gearing for controlling the amount of rotation thereof comprising a stopping device for each digit 1 to 9, wherein each stopping device comprises two relatively movable members, coöperative abutments thereon normally spaced apart in angular position determined by the amount of angular movement of the actuating gearing to be permitted thereby, and means for holding one member of the stopping device fixed in position during movement of the other member so as to bring the coöperative abutments into engagement and thereby prevent further rotation of the actuating gearing; and means for turning the controlling mechanism and the actuating gearing until stopped by the coöperative abutments; substantially as described.

31. In a calculating machine, an adding mechanism comprising a plurality of indicators and transfer devices therefor; actuating gearings for registering the products of digits on the adding mechanism; controlling mechanism mounted on a common shaft and adapted to control the amount of rotation of the actuating gearing; said controlling mechanism comprising a stopping device for each digit 1 to 9, consisting of a member loose on a shaft, a member fast on the shaft, coöperative abutments on the two members normally spaced apart in angular position determined by the amount of angular movement of the actuating gearing to be permitted thereby, a spring tending to bring said members to their normal position relatively to each other, and a shiftable bar for each digit for holding the loosely-mounted member of the corresponding stopping device fixed in position during rotation of the shaft so as to bring the coöperative abutments into engagement and thereby prevent further rotation of the gearing; and means for turning the controlling mechanism and the actuating gearing until stopped by the coöperative abutments; substantially as described.

32. In a calculating machine, an adding mechanism comprising a plurality of indicators and transfer devices therefor, a plurality of variable-ratio gearings adapted to be actuated in either direction to register the products of digits in one direction of rotation and the arithmetical complements of the products of digits in the other direction of rotation, and means for actuating the gearings in either direction at will; substantially as described.

33. In a multiplying machine, an adding mechanism, a reversible variable-ratio actuating gearing therefor, controlling mechanism rotatable in a single direction for predetermining the amount of rotation of the actuating gearing in proportion to the multiplier digits 1 to 9, driving mechanism embodying reversing gearing between the controlling mechanism and the actuating gearing and being designed to drive the actuating gearing in either direction at will and to drive the controlling mechanism in the same direction at all times; substantially as described.

34. In a multiplying machine, an adding mechanism, a reversible variable-ratio actuating gearing therefor, controlling mechanism rotatable in a single direction for predetermining the amount of rotation of the actuating gearing in proportion to the multiplier digits 1 to 9, means for driving the controlling mechanism in a single direction, and reversing gearing between the controlling mechanism and the actuating gearing to reverse the latter at will; substantially as described.

35. In a multiplying machine, an adding mechanism comprising a plurality of indicators and transfer devices therefor; actuating gearing for registering the products of digits on the adding mechanism; means for actuating the gearing in accordance with the digits 1 to 9; and a plurality of multiplier-digit setting devices of different denominations, wherein each setting device first operatively connects the gearing with the series of indicators corresponding to the denomination of the multiplier digit, irrespective of the preceding denominational connection between the actuating gearing and the adding mechanism, and then permits an amount of actuation of the gearing according to the value of the multiplier digit; substantially as described.

36. In a multiplying machine, a non-indenting adding mechanism comprising a plurality of indicators and transfer devices therefor, actuating gearing for registering the products of digits on the adding mechanism, means for actuating the gearing in accordance with the digits 1 to 9, and a plurality of multiplier-digit setting devices of different denominations, each of which is designed to first operatively connect the gearing with the series of indicators corresponding to the denomination of the multiplier digit, irrespective of the preceding denominational connection between the actuating gearing and the adding mechanism, and to then permit an amount of actuation of the gearing according to the value of the multiplier digit; substantially as described.

37. In a multiplying machine, a non-indenting adding mechanism comprising a plurality of indicators and transfer devices therefor, a non-indenting multiplying mechanism for registering the products of digits on the adding mechanism, means for actuating the multiplying mechanism in accordance with the digits 1 to 9, and a plurality of multiplier-digit setting devices of different denominations, each of which is designed to first operatively connect the multiplying mechanism with the series of indicators corresponding to the denomination of the multiplier digit and to then permit an amount of actuation of the multiplying mechanism according to the value of the multiplier digit; substantially as described.

38. In a multiplying machine, an adding mechanism comprising a plurality of indicators and transfer devices therefor; actuating gearing for registering the products of digits on the adding mechanism; means for actuating the gearing in accordance with the multiplier digits 1 to 9; a plurality of multiplier keys arranged in a number of banks equal to the number of multiplier digits provided for; a selector for each bank actuated by any key thereof to operatively connect the gearing with the series of indicators corresponding to the denomination of the bank; and means provided for each series of keys of the same value, irrespective of the denomination thereof, and actuated by any key of the series to control the actuation of the gearing in accordance with the value of the key; substantially as described.

39. In a multiplying machine, an adding mechanism comprising a plurality of indicators and transfer devices therefor; actuating gearing for registering the products of digits on the adding mechanism; a motor for actuating the gearing; controlling mechanism for controlling the amount of actuation of said gearing in accordance with the digits 1 to 9; a plurality of setting devices for the multiplier digits, wherein each setting device is adapted to first set the controlling mechanism in accordance with the multiplier digit, and to then release the motor to actuate the gearing; substantially as described.

40. In a calculating machine, an adding mechanism, and a multiplying mechanism therefor comprising a disk having engaging points arranged continuously throughout a plurality of concentric circles and forming a plurality of passages extending from the innermost to the outermost circles, and a gear wheel coöperative with the engaging points and movable along said passages from one to another of said circles; substantially as described.

41. In a calculating machine, an adding mechanism, and a multiplying mechanism therefor comprising a disk having circular series of engaging points arranged in a plurality of adjacent sectors separated by radially-disposed passages, and a gear wheel coöperative with the engaging points and movable along said passages from one to another of said circular series; substantially as described.

42. In a calculating machine, an adding mechanism, and a multiplying mechanism therefor comprising a disk having a plurality of like sectors of engaging points forming concentric series throughout the sectors and also forming equally-spaced radially-disposed passages between the sectors, and a gear wheel movable along said passages from one to another of said series; substantially as described.

43. In a multiplying machine, an adding mechanism, comprising a plurality of indicators and transfer devices therefor, actuating gearing for registering the products of digits on the adding mechanism, means for actuating said gearing in accordance with the separate digits of the multiplier, a multiplier indicator for each denomination of the multiplier, driving mechanism in constant connective relation with all the multiplier indicators, and selective mechanism for determining the multiplier indicator on which the actuation is registered so that the multiplier indicators show the multiplier digits in proper denominational relation to indicate the multiplier factor at the end of the multiplication operation; substantially as described.

44. In a multiplying machine, an adding mechanism comprising a plurality of indicators and transfer devices therefor, actuating gearing for registering the products of digits on the adding mechanism, means for actuating said gearing in accordance with the separate digits of the multiplier, multiplier indicators mounted loosely on a common shaft, means for driving said shaft in accordance with the amount of actuation of said gearing to register the multiplier digits on the multiplier indicators, and a selector for each denomination of the multiplier for connecting the multiplier indicator of proper denomination to the shaft so as to register the multiplier digits in proper denominational relation to indicate the multiplier factor thereon at the end of the multiplication operation; substantially as described.

45. In a calculating machine, a plurality of result indicators and transfer devices therefor, actuating gearing for registering on the result indicators, means for actuating said gearing in either direction in accordance with the digits of a factor to be set up, a plurality of factor indicators to indicate the separate digits of said factor, a selector for each denomination of said factor for selecting the factor indicator of its denomination, and means for driving the selected one of said factor indicators in each case in accordance with the amount and direction of the actuation of said gearing to register the digits of the factor in proper denominational relation to indicate the factor thereon at the end of the calculation; substantially as described.

46. In a calculating machine, an adding mechanism comprising a plurality of indicators and transfer devices therefor, driving mechanism for registering on the adding mechanism, and locking mechanism for locking certain indicators against rotation, the arrangement being such that the operation of unlocking any one indicator unlocks all those of lower denomination without unlocking those of higher denomination; substantially as described.

47. In a calculating machine, an adding mechanism having a plurality of indicators of successive denomination and interconnected differential gearing actuating the indicators, driving mechanism for registering on the adding mechanism, and a rectifier operative directly on the indicators in the order of ascending denomination; substantially as described.

48. In a calculating machine, an adding mechanism having a plurality of indicators of successive denomination and interconnected differential gearing actuating the indicators, driving mechanism for registering on the adding mechanism, and a rectifier which operates directly on the indicators in the order of ascending denomination and which holds against movement those indicators which have been rectified until the rectifying operation is completed; substantially as described.

49. In a calculating machine, an adding mechanism having a plurality of indicators of successive denomination and interconnected differential gearing actuating the indicators, driving mechanism for registering on the adding mechanism, a rectifier operative directly on the indicators of the adding mechanism in the order of ascending denomination, and rectifier actuating mechanism designed to operate when the driving mechanism is inoperative; substantially as described.

50. In a calculating machine, an adding mechanism comprising a plurality of polygonal faced dials and transfer mechanism therefor, driving mechanism for registering on the adding mechanism, and a rectifier embodying a plurality of cam members arranged to engage the faces of the dials in order of ascending denomination to progressively complete the carrying operation of the transfer devices; substantially as described.

51. In a calculating machine, an adding mechanism comprising a plurality of indicators and transfer devices therefor, driving mechanism adapted to register on the adding mechanism, a rectifier for rectifying the indicators, a spring motor which is locked during the actuation of the driving mechanism, connections from the motor for operating the rectifier, and means for releasing the motor to operate the rectifier when the driving mechanism is stopped; substantially as described.

52. In a calculating machine, an adding mechanism comprising a plurality of indicators and transfer devices therefor, driving mechanism adapted to register on the adding mechanism, a rectifier for rectifying the indicators, a spring, mechanism for winding the spring during each actuation of the driving mechanism, connections from the spring for operating the rectifier therefrom, and means for releasing the spring to operate the rectifier after each actuation of the driving mechanism; substantially as described.

In testimony whereof we affix our signatures, in presence of two witnesses.

LEON W. ROSENTHAL.
MARCUS C. HOPKINS.

Witnesses:
MINERVA LOBEL,
FRANK A. HENNESSY.

Copies of this patent may be obtained for five cents each, by addressing the "Commissioner of Patents, Washington, D. C."